(12) United States Patent
Chen (10) Patent No.: US 11,089,876 B2
(45) Date of Patent: Aug. 17, 2021

(54) CHAIR, AND ARMREST ASSEMBLY AND ADJUSTMENT MECHANISM THEREOF

(71) Applicant: PAO SHEN ENTERPRISES CO., LTD., Chang Hua (TW)

(72) Inventor: Jung-Feng Chen, Chang Hua (TW)

(73) Assignee: PAO SHEN ENTERPRISES CO., LTD., Chang Hua (TW)

( * ) Notice: Subject to any disclaimer, the term of this patent is extended or adjusted under 35 U.S.C. 154(b) by 23 days.

(21) Appl. No.: 16/822,973

(22) Filed: Mar. 18, 2020

(65) Prior Publication Data

US 2021/0120958 A1 Apr. 29, 2021

(30) Foreign Application Priority Data

Oct. 29, 2019 (TW) .................................. 108139042

(51) Int. Cl.
  *A47C 7/54* (2006.01)
  *F16C 11/04* (2006.01)
(52) U.S. Cl.
  CPC .............. *A47C 7/541* (2018.08); *F16C 11/04* (2013.01)
(58) Field of Classification Search
  CPC .......... A47C 1/03; A47C 1/0308; A47C 7/541
  USPC ....................................................... 297/411.38
  See application file for complete search history.

(56) References Cited

U.S. PATENT DOCUMENTS

| | | | | |
|---|---|---|---|---|
| 7,150,504 | B1 * | 12/2006 | Lee ...................... | A47C 1/0307 297/411.35 |
| 10,143,310 | B1 * | 12/2018 | Wang .................... | A47C 7/541 |
| 10,674,822 | B1 * | 6/2020 | Koyama ................ | G03G 15/80 |
| 2008/0073965 | A1 | 3/2008 | Tsai | |

* cited by examiner

*Primary Examiner* — Sarah B McPartlin
(74) *Attorney, Agent, or Firm* — Burris Law, PLLC (57) ABSTRACT

An adjustment mechanism is adapted to be installed in an armrest that includes a support member and an arm member disposed over and mounted rotatably to the support member. The adjustment mechanism includes a fixed unit adapted to be fixedly mounted in the support member, and a rotating unit adapted to be co-rotatable with the arm member. The fixed unit includes an elastic plate formed with a plurality of notches, and a joint block having a plurality of concavities. The rotating unit includes a linking plate having two rotating columns, and an engaging component. The rotating columns removably engage two corresponding ones of the notches, and the engaging component removably engages one of the concavities of the joint block.

10 Claims, 13 Drawing Sheets

CHAIR, AND ARMREST ASSEMBLY AND ADJUSTMENT MECHANISM THEREOF

CROSS-REFERENCE TO RELATED APPLICATION

This application claims priority of Taiwanese Patent Application No. 108139042, filed on Oct. 29, 2019.

FIELD

The disclosure relates to a chair, and more particularly to an armrest assembly of a chair having an armrest that is rotatable via an adjustment mechanism.

BACKGROUND

Figure 1:
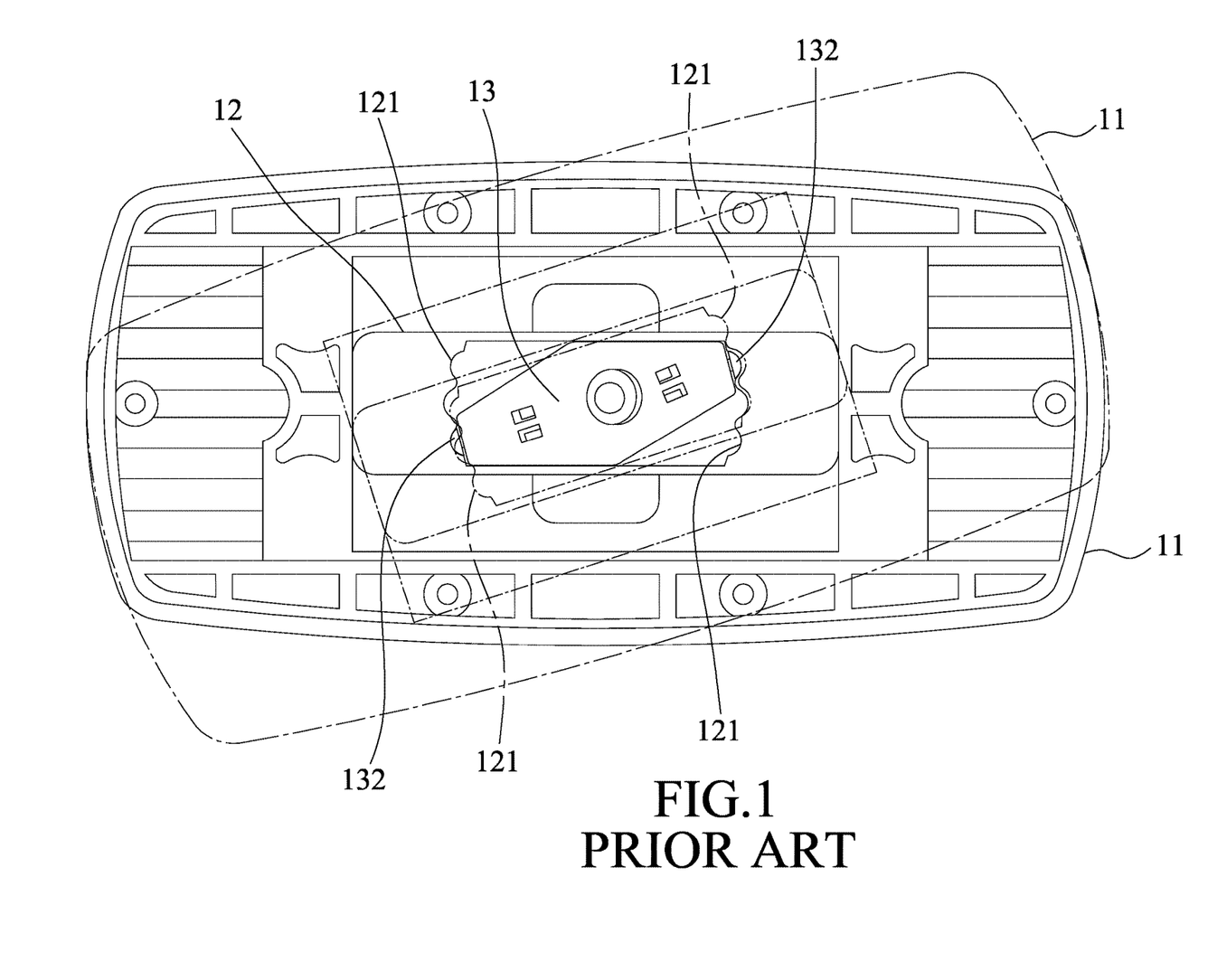
FIG. 1 is a fragmentary top view of an armrest, illustrating a conventional adjustment mechanism disclosed in U.S. Patent Application Publication No. 20080073965A1.
Figure 2:
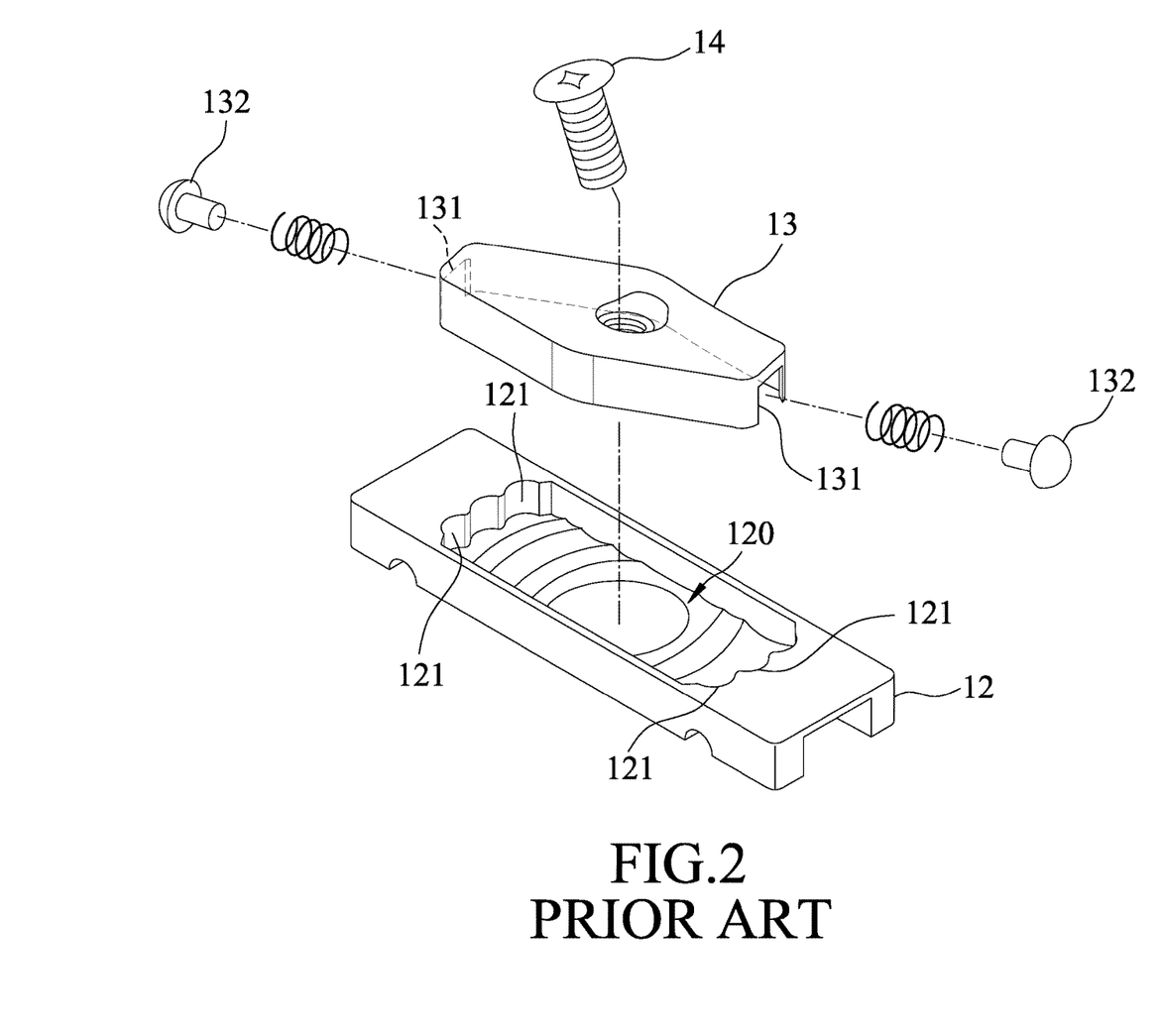
FIG. 2 is an exploded perspective view of the conventional adjustment mechanism.

A conventional adjustment mechanism disclosed in U.S. Patent Application Publication No. 20080073965A1 is adapted to be installed in a chair, and includes a rotation member 12 and a retainer 13.

The chair includes an armrest support (not shown) and an armrest 11 that is disposed over and mounted rotatably to the armrest support. The rotation member 12 is mounted co-rotatably in the armrest 11, and has an inner surface that defines a compartment 120. The inner surface of the rotation member 12 has two toothed portions arranged at opposite sides of the compartment 120. Each of the toothed portions defines a plurality of recesses 121 that are in spatial communication with the compartment 120.

The retainer 13 is disposed in the compartment 120 of the rotation member 12, and has two opposite openings 131 and two locking stubs 132 that are received respectively in the openings 131. A screw 14 threadedly engages the retainer 13 and extends through a bottom end of the rotation member 12 to connect the retainer 13 to the armrest support. Each of the locking stubs 132 of the retainer 13 removably engages one of the recesses 121 of a respective one of the toothed portions of the rotation member 12, such that the armrest 11 is positioned relative to the armrest support.

To adjust the armrest 11, that is, to rotate the armrest 11 relative to the armrest support, a user simply apply force on the armrest 11. Once a rotational force applied by the user exceeds a resistance resulting from friction between the locking stubs 132 and the corresponding recesses 121, the locking stubs 132 are disengaged from the recesses 121, thereby allowing the rotation member 12 to rotate with the armrest 11 relative to the retainer 13 and the armrest support until the locking stubs 132 engage another two of the recesses 121.

However, during use of such conventional adjustment mechanism, the user may unintentionally rotate the armrest 11 since the friction between the locking stubs 132 and the toothed portions 121 often fails to provide sufficient resistance. To solve the problem, the adjustment mechanism can be upscaled in size (i.e. to increase the total contact area of friction). Still, this creates another problem; since the adjustment mechanism is installed in the armrest 11, an overall size of the armrest 11 would have to be upscaled as well, which may result in a bulky and heavy chair and limit possibilities of size reduction.

SUMMARY

Therefore, an object of the disclosure is to provide an adjustment mechanism that can alleviate at least one of the drawbacks of the prior art.

Accordingly, an adjustment mechanism is adapted to be installed in an armrest. The armrest includes an arm member and a support member that are arranged in a top-bottom direction. The arm member is disposed over and mounted rotatably to the support member. The adjustment mechanism includes a fixed unit and a rotating unit.

The fixed unit is adapted to be fixedly mounted in the support member and includes a fixed plate, a positioning plate, an elastic plate and a joint block.

The fixed plate is adapted to be adjacent to the arm member, and has two spaced-apart arc slots that extend therethrough in the top-bottom direction. The positioning plate is disposed under and fixedly mounted to the fixed plate. The elastic plate is fixedly mounted to the fixed plate, is disposed between the arc slots of the fixed plate, and has an outer peripheral surface that is formed with a plurality of notches. At least two of the notches face one of the arc slots, and the remaining of the notches face the other one of the arc slots. The joint block extends from one of the fixed and positioning plates toward the other one of the fixed and positioning plates, and has a plurality of concavities.

The rotating unit includes a linking plate, a rotating plate and an engaging component.

The linking plate has a linking plate body that is adapted to be mounted co-rotatably in the arm member, and two rotating columns that are connected to the linking plate body, that are adapted to extend out of the arm member, and that extend respectively and movably into the arc slots of the fixed plate. Each of the rotating columns removably engages a corresponding one of the notches of the elastic plate which faces a respective one of the arc slots. The rotating plate is disposed between the fixed plate and the positioning plate, and is co-rotatably connected to the rotating columns of the linking plate. The engaging component is co-rotatably mounted to the rotating plate and removably engages one of the concavities of the joint block.

Another object of the disclosure is to provide an armrest assembly including the above-mentioned adjustment mechanism.

Accordingly, an armrest assembly includes an armrest and the above-mentioned adjustment mechanism. The armrest includes an arm member and a support member being arranged in a top-bottom direction. The arm member is disposed over and mounted rotatably to the support member. The adjustment mechanism is installed in the armrest.

Another object of the disclosure is to provide a chair including the above-mentioned armrest assembly.

Accordingly, a chair includes a seat assembly, a base assembly that is disposed under and mounted to the seat assembly, and at least one of the above-mentioned armrest assembly that is connected to the seat assembly.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 3:
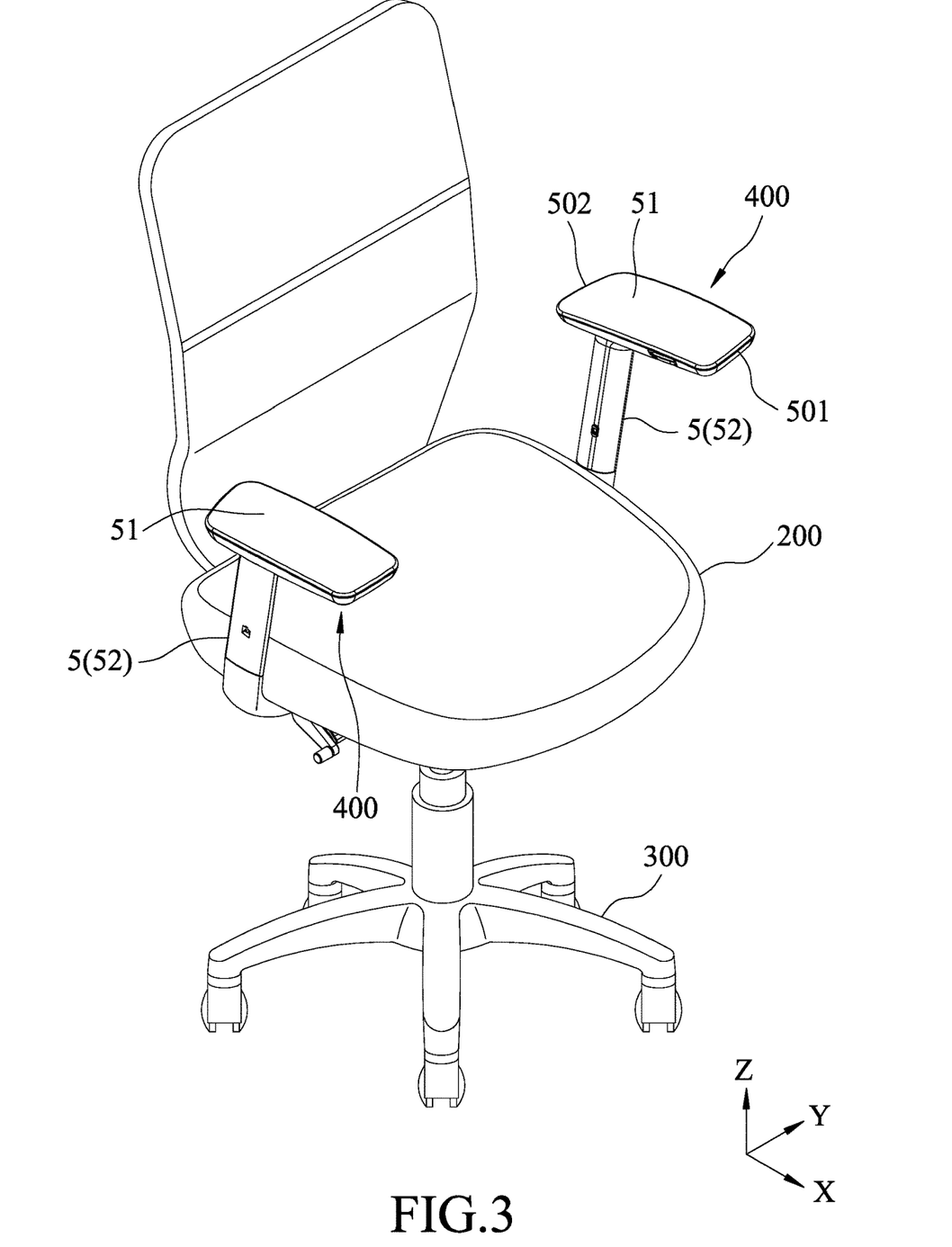
FIG. 3 is a perspective view of an embodiment of a chair according to the disclosure.
Figure 4:
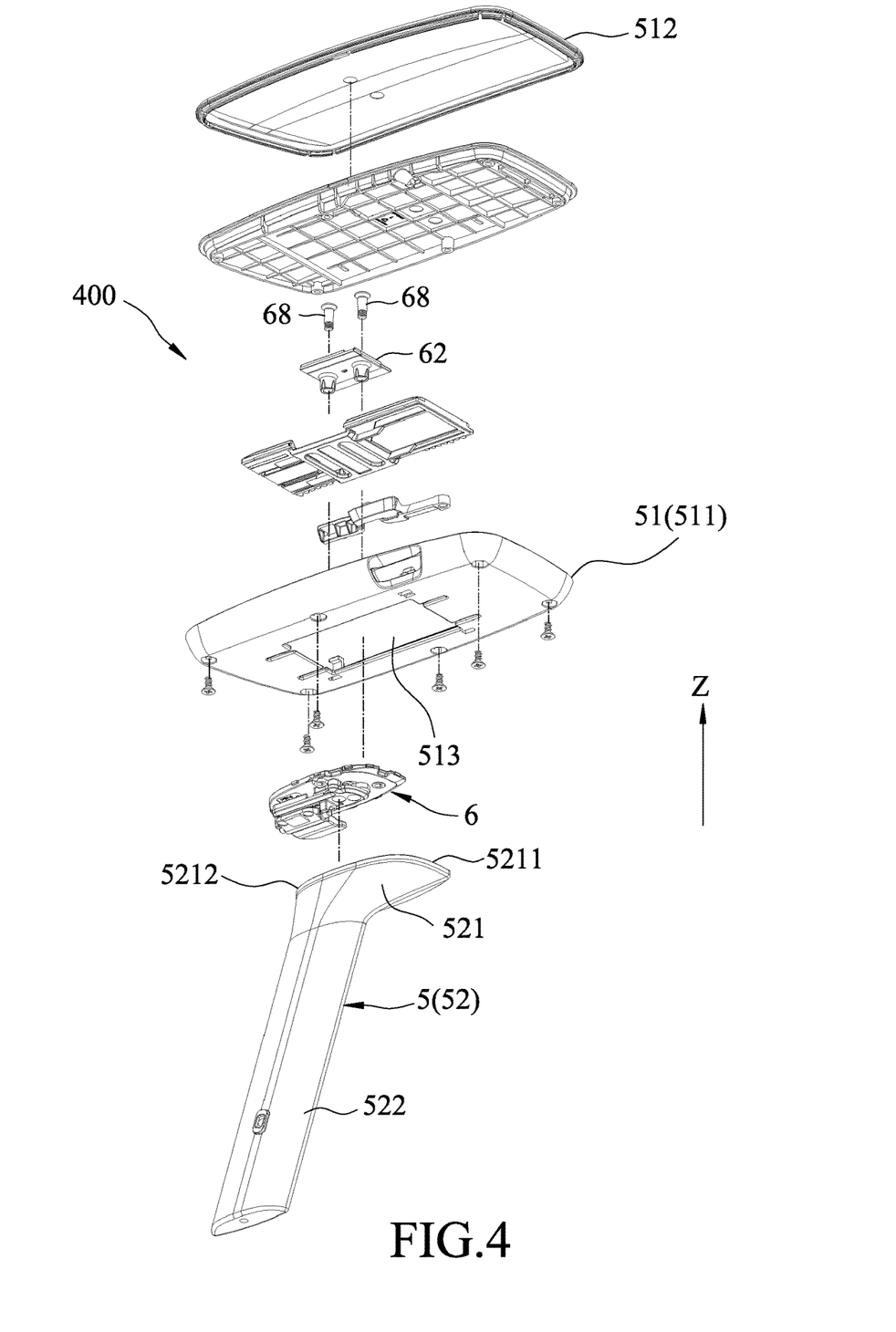
FIG. 4 is a partly exploded perspective view of an armrest assembly of the embodiment.

Referring to FIGS. 3 and 4, an embodiment of a chair according to the disclosure includes a seat assembly 200, abase assembly 300 and two armrest assemblies 400.

The seat assembly 200 is adapted for a user to sit thereon. The base assembly 300 is disposed under and mounted to the seat assembly 200 for support. The armrest assemblies 400 are spaced apart in a left-right direction (Y) and are connected to opposite sides of the seat assembly 200. Each of the armrest assemblies 400 includes an armrest 5 and an adjustment mechanism 6. Since the armrest assemblies 400 are symmetrical, the following description refers to only one of the armrest assemblies 400 of the chair for the sake of brevity.

The armrest 5 of the armrest assembly 400 includes an arm member 51 and a support member 52 that are arranged in a top-bottom direction (Z) substantially perpendicular to the left-right direction (Y). The arm member 51 is disposed over and mounted rotatably to the support member 52.

Figure 5:
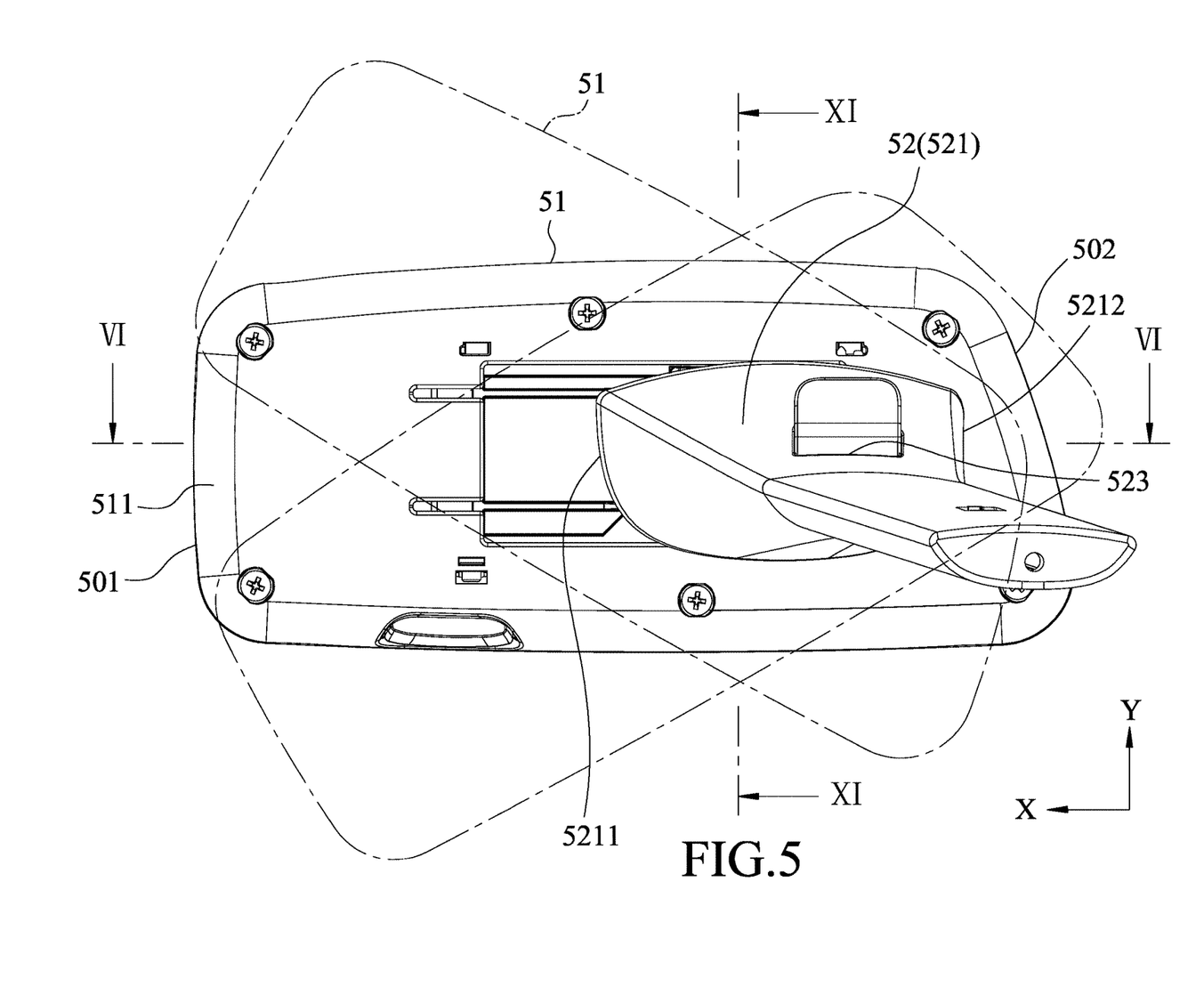
FIG. 5 is a bottom schematic view of the armrest assembly, illustrating an arm member being rotatable relative a support member.
Figure 6:
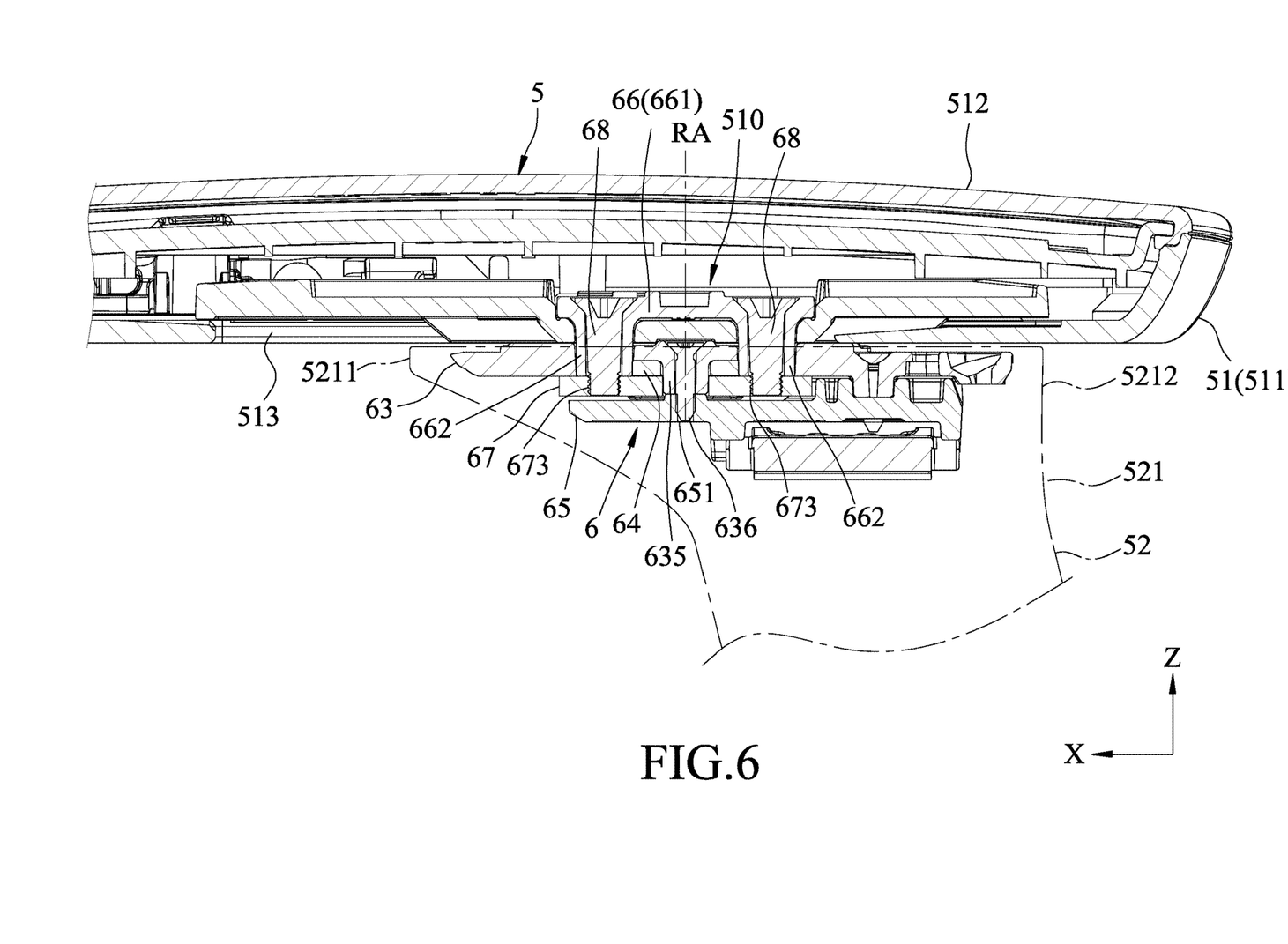
FIG. 6 is a fragmentary sectional view taken along line VI-VI in FIG. 5.

Referring to FIGS. 4 to 6, the support member 52 has a hollow upper portion 521 and a lower portion 522 connected to a bottom end of the upper portion 521. The upper portion 521 has front and rear sides 5211, 5212 that are opposite to each other in a front-rear direction (X) substantially perpendicular to the left-right and top-bottom directions (Y, Z), and is formed with a side opening 523 communicated with the inside of the upper portion 521. The arm member 51 has front and rear ends 501, 502 disposed respectively at front and rear sides 5211, 5212 of the upper portion 521 of the support member 52. In the present embodiment, the arm member 51 includes a bottom casing 511 and a top board 512. The bottom casing 511 is connected rotatably to the upper portion 521 of the support member 52, defines a receiving space 510, and is formed with a bottom opening 513 that is spatially communicated with the receiving space 510. The top board 512 is disposed over the bottom casing 511 for covering the receiving space 510, and is adapted for the user to lay his/her arm thereon.

Figure 7:
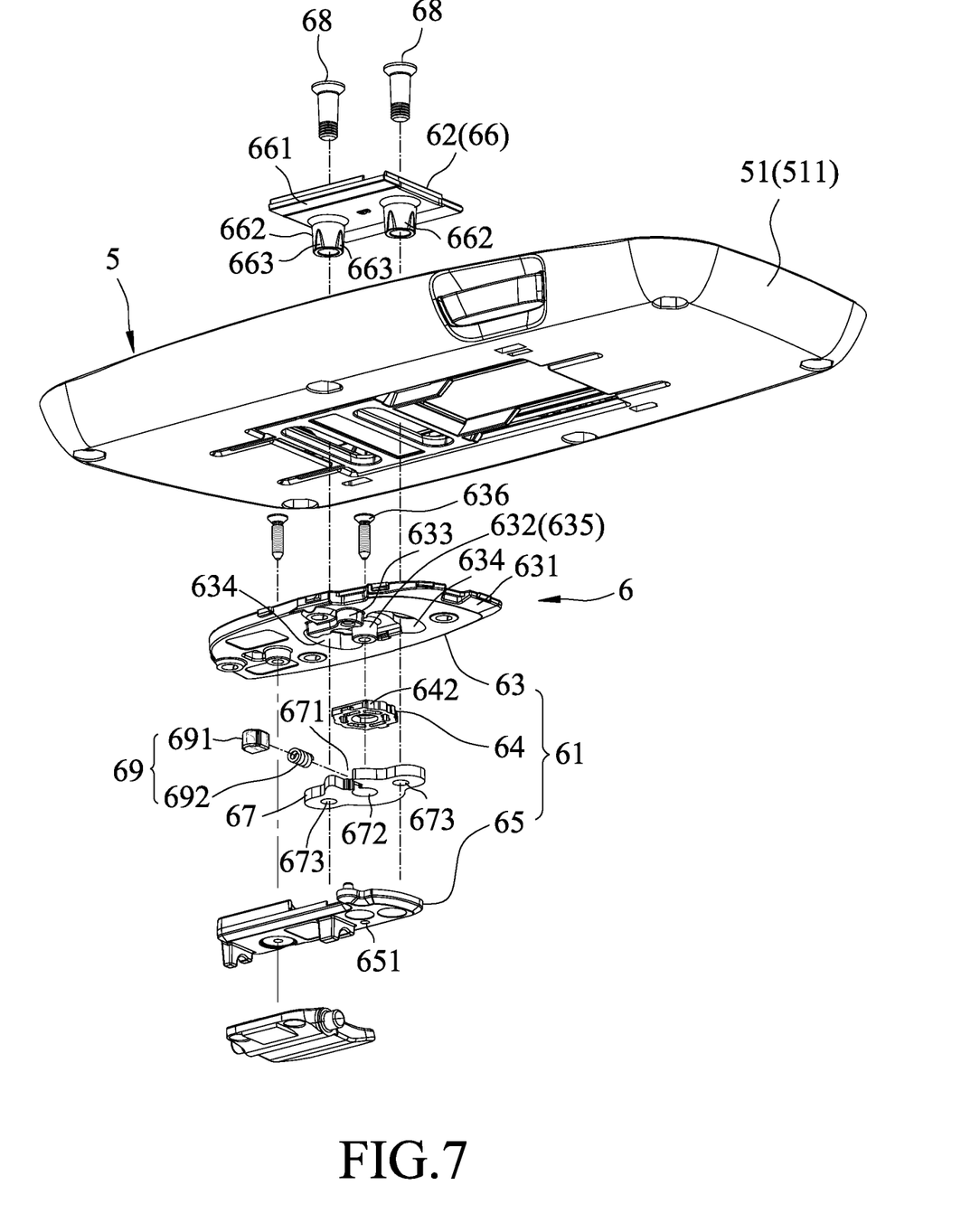
FIG. 7 is a fragmentary exploded perspective view of the armrest assembly.
Figure 8:
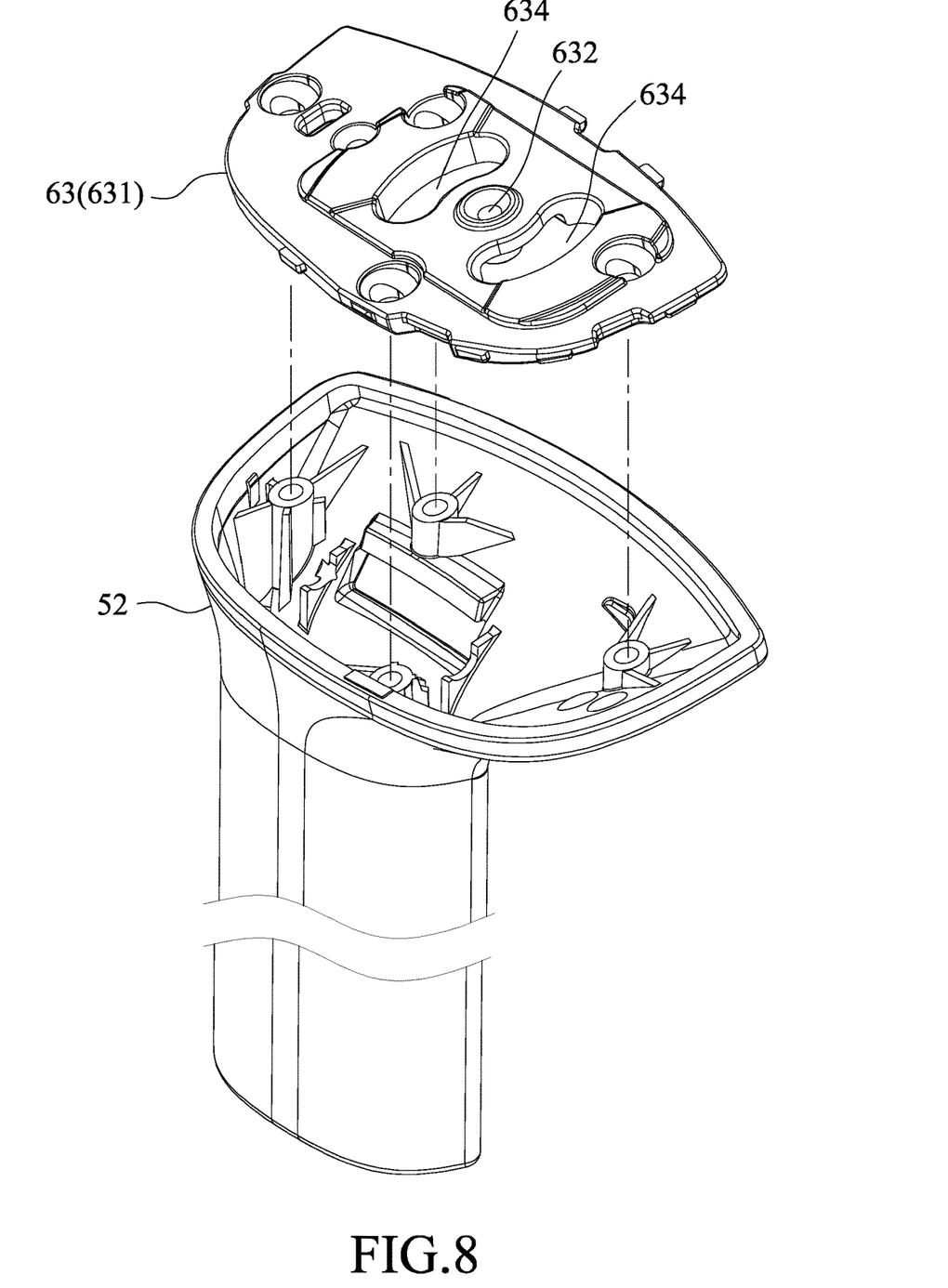
FIG. 8 is a fragmentary exploded perspective view of a fixed plate and the support member of the armrest assembly.

Referring to FIGS. 6 to 8, the adjustment mechanism 6 is installed in the armrest 5 and includes a fixed unit 61 and a rotating unit 62.

The fixed unit 61 is fixedly mounted inside the upper portion 521 of the support member 52 and includes a fixed plate 63, an elastic plate 64, a positioning plate 65 and a joint block 633.

Figure 9:
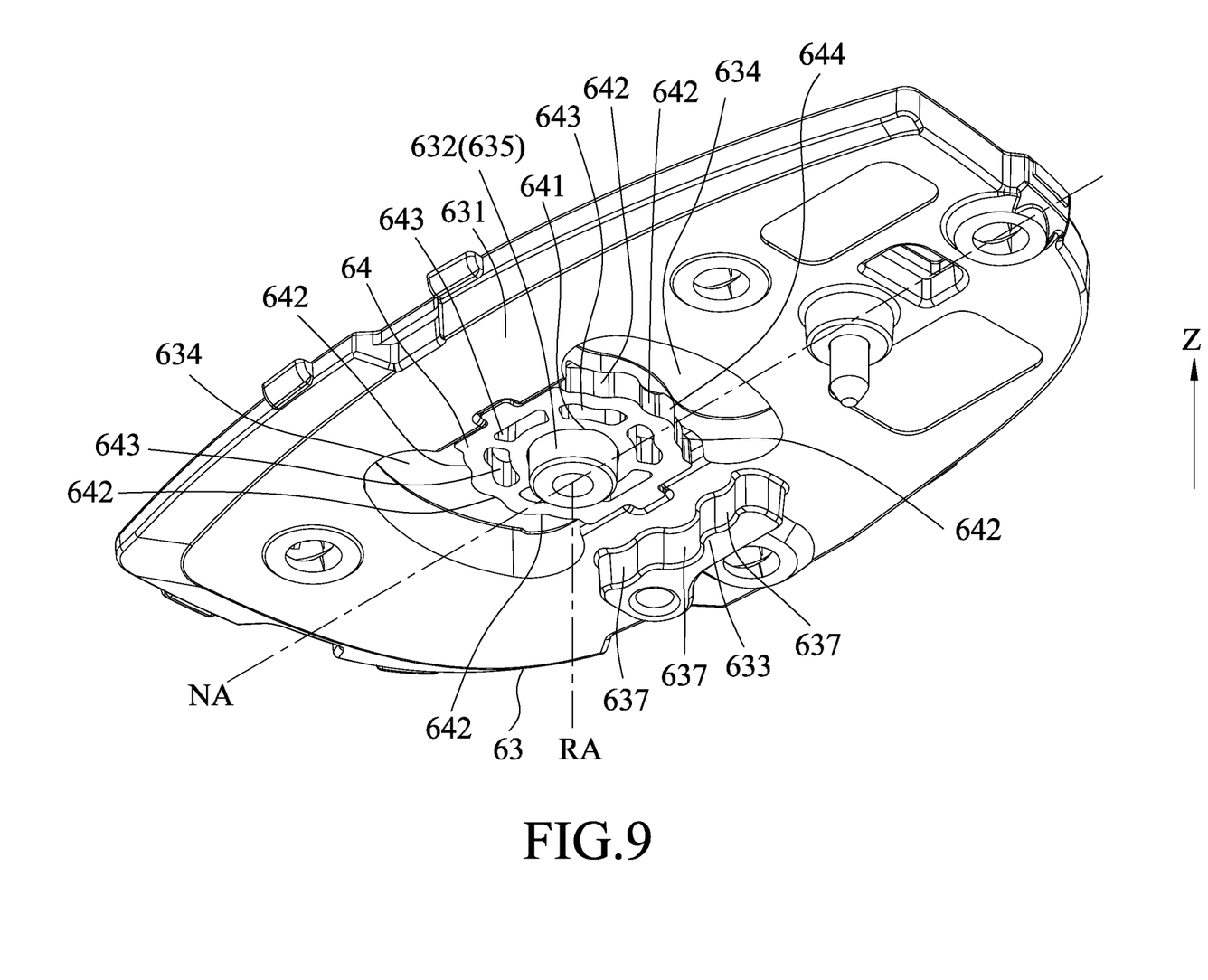
FIG. 9 is an assembled perspective view of the fixed plate, a joint block and an elastic plate of the armrest assembly.

Referring to FIGS. 6, 7 and 9, the fixed plate 63 of the fixed unit 61 has a fixed plate body 631, a fixed shaft 632 and two spaced-apart arc slots 634.

The fixed plate body 631 of the fixed plate 63 is adjacent to the arm member 51 of the armrest 5, is fastened to the support member 52 of the armrest 5, and is formed with the arc slots 634. In this embodiment, the fixed plate body 631 is fastened to the support member 52 via threaded fasteners.

The fixed shaft 632 of the fixed plate 63 includes a shaft tube 635 that extends from the fixed plate body 631 along a rotational axis (RA) extending in the top-bottom direction (Z), and a positioning fastener 636 that extends through the shaft tube 635.

The arc slots 634 of the fixed plate 63 extend through the fixed plate body 631 in the top-bottom direction (Z), are arranged along a neutral axis (NA) that is perpendicular to the rotational axis (RA), and are disposed respectively at opposite sides of the rotational axis (RA). A recess is formed in a bottom surface of the fixed plate body 631, and is disposed between and interconnects the arc slots 634.

The elastic plate 64 of the fixed unit 61 is embedded fixedly in the fixed plate 63. Specifically, the elastic plate 64 is mounted in the recess of the fixed plate body 631 between the arc slots 634, and is substantially flushed with the bottom surface of the fixed plate body 631. In this embodiment, the elastic plate 64 has a center hole 641, a plurality of buffer holes 643, and an outer peripheral surface 644 that surrounds the center hole 641 and the buffer holes 643 and that is formed with six notches 642.

The elastic plate 64 is sleeved on the fixed shaft 632 of the fixed plate 63 with the fixed shaft 632 extending through the center hole 641. The buffer holes 643 extend through the elastic plate 64, and are arranged between the center hole 641 and the outer peripheral surface 644 of the elastic plate 64. Three of the notches 642 face one of the arc slots 634, and the remaining three of the notches 642 face the other one of the arc slots 634.

It should be noted that, in the present embodiment, the fixed plate 63 and the elastic plate 64 are formed separately, and the elastic plate 64 is made of a plastic material. In virtue of the configuration of the buffer holes 643 and the material property of the plastic material, the elastic plate 64 provides flexibility to enable a smooth operation for the adjustment mechanism 6, which will be described later. However, in variations of the embodiment, the fixed plate 63 and the elastic plate 64 may be molded as one piece as well.

The positioning plate 65 of the fixed unit 61 is disposed under the fixed and elastic plates 63, 64, and is fixedly mounted to the fixed plate 63. Specifically, the positioning plate 65 has a positioning hole 651 being engaged with the fixed shaft 632 of the fixed plate 63 in a manner that the positioning fastener 636 of the fixed shaft 632 threadedly engages the positioning hole 651 of the positioning plate 65. However, in other embodiments of the disclosure, the fixed shaft 632 may be configured as a solid shaft provided with an external thread which engages threadedly the positioning hole 651 without the positioning fastener 636.

The joint block 633 of the fixed unit 61 extends from the fixed plate 63 toward the positioning plate 65, and has three concavities 637 that face the fixed shaft 632 of the fixed plate 63. In the present embodiment, the joint block 633 is configured with a waved surface that defines the three concavities 637, and the joint block 633 and the fixed plate 63 are molded as one piece.

Figure 10:
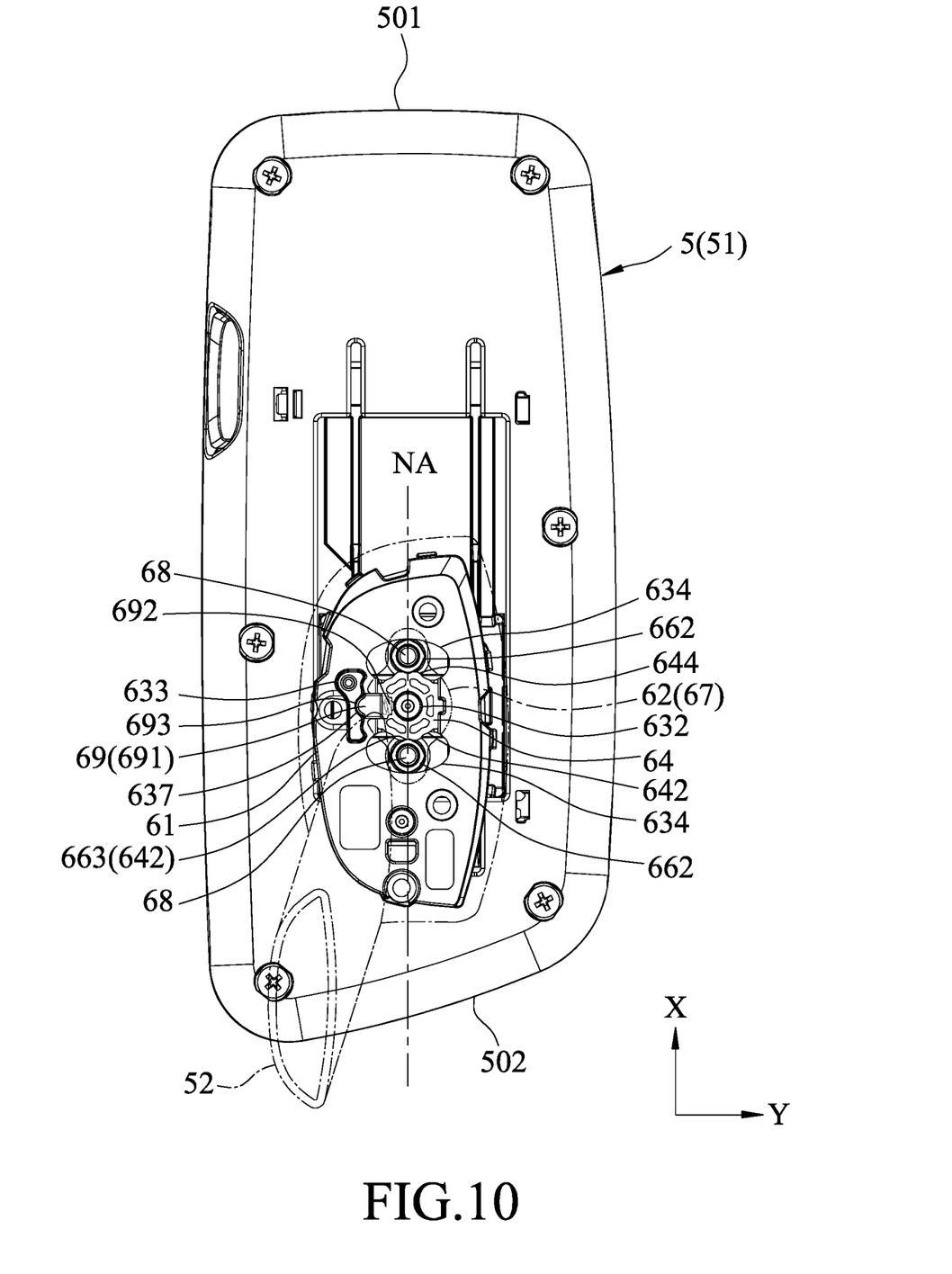
FIG. 10 is a fragmentary bottom view of the armrest assembly, illustrating a rotating unit at a neutral position relative to a fixed unit.

Referring to FIGS. 6, 7 and 10, the rotating unit 62 is co-rotatably connected to the arm member 51 of the armrest 5, and includes a linking plate 66, a rotating plate 67, two connecting fasteners 68 and an engaging component 69.

The linking plate 66 of the rotating unit 62 has a linking plate body 661 and two rotating columns 662. The linking plate body 661 is mounted co-rotatably in the arm member 51 of the armrest 5. The rotating columns 662 are connected to the linking plate body 661, extend out of the arm member 51 via the bottom opening 513, and extend respectively and movably into the arc slots 634 of the fixed plate 63 of the fixed unit 61. Each of the rotating columns 662 removably engages a corresponding one of the three notches 642 of the elastic plate 64 which faces a respective one of the arc slots 634 of the fixed plate 63. In the present embodiment, each of the rotating columns 662 of the linking plate 66 has an external surface that is formed with four convex portions 663 that are equi-angularly arranged for enhancing frictional engagement between each of the rotating columns 662 and the corresponding one of the notches 642 of the elastic plate 64.

It should be noted that the support member 52 is connected to the arm member 51 via the linking plate 66 abutting against and connected to the bottom casing 511 of the arm member 51.

Figure 11:
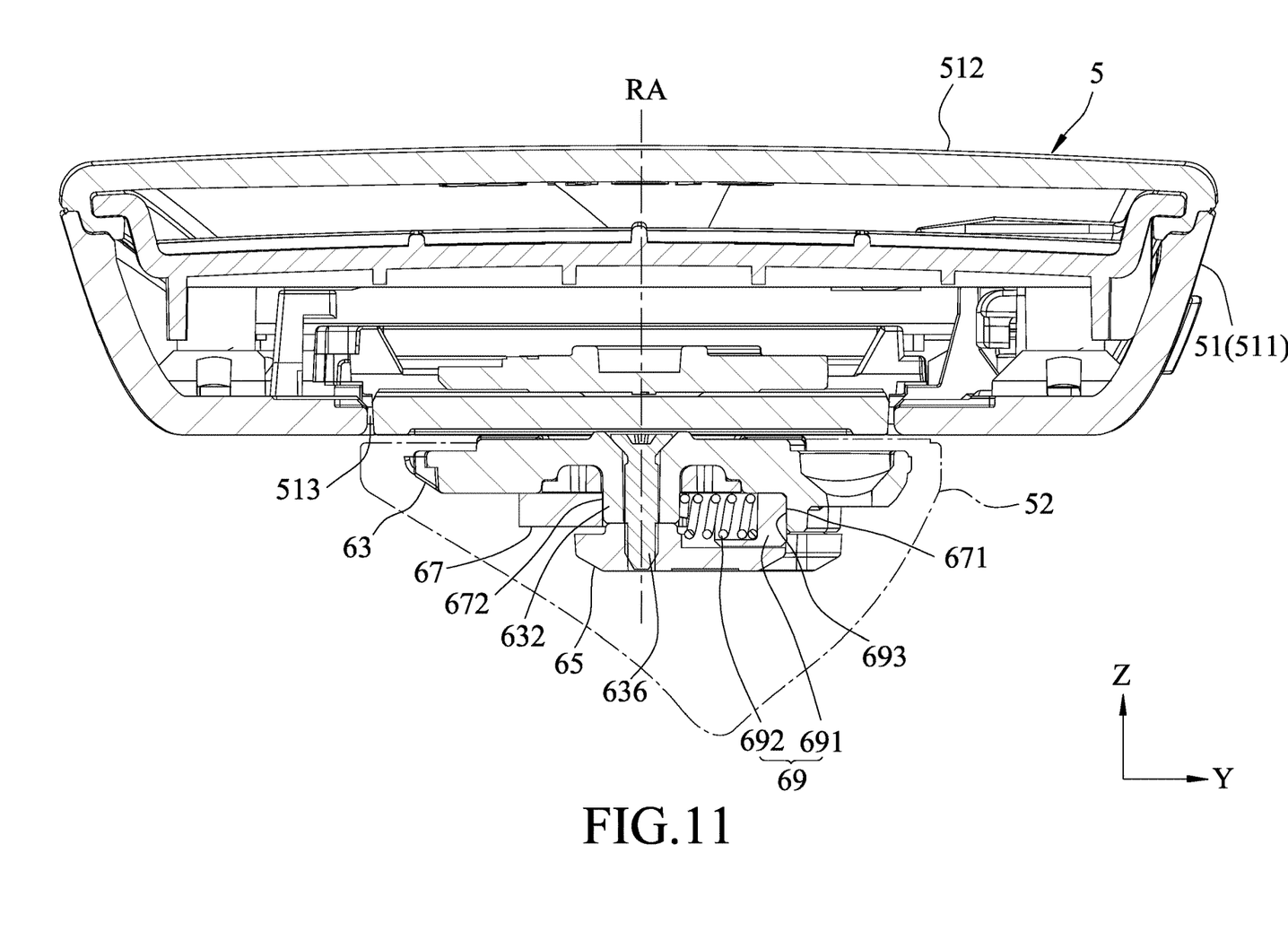
FIG. 11 is a fragmentary sectional view taken along line XI-XI in FIG. 5.

Referring to FIGS. 6, 7 and 11, the rotating plate 67 of the rotating unit 62 is disposed between the fixed plate 63 and the positioning plate 65 of the fixed unit 61, and has a through hole 672, two spaced-apart screw holes 673, and an outer peripheral surface surrounding the rotational axis (RA) and formed with a receiving slot 671.

The receiving slot 671 is proximate to the concavities 637 of the joint block 633. The through hole 672 is spatially communicated with the receiving slot 671, and is engaged with the fixed shaft 632 of the fixed plate 63 of the fixed unit 61. The screw holes 673 are disposed respectively at opposite sides of the through hole 672, and are registered respectively with the rotating columns 662 of the linking plate 66.

The connecting fasteners 68 of the rotating unit 62 extend respectively through the rotating columns 662 of the linking plate 66, and engage respectively and threadedly the screw holes 673 of the rotating plate 67, such that the rotating plate 67 is co-rotatably connected to the linking plate 66, and that the rotating unit 62 is rotatable about the rotational axis (RA) relative to the fixed unit 61.

Referring to FIGS. 7, 10 and 11, the engaging component 69 of the rotating unit 62 is co-rotatably mounted to the rotating plate 67 to be engaged with one of the concavities 637 of the joint block 633.

In the present embodiment, the engaging component 69 includes an engaging seat 691 and a spring 692. The engaging seat 691 is movably received in the receiving slot 671, and has an engaging protrusion 693 that removably engages the one of the concavities 637. The spring 692 has opposite ends abutting respectively against the engaging seat 691 and the fixed shaft 632 for enhancing the engagement between the engaging protrusion 693 and the one of the concavities 637. However, in variations of the embodiment, the receiving slot 671 and the through hole 672 of the rotating plate 67 may not be spatially communicated with each other such that the opposite ends of the spring 692 abut respectively against the engaging seat 691 and an inner surface of the rotating plate 67 which defines the receiving slot 671, which still provides the same function as mentioned.

It should be noted that, in other embodiments of the disclosure, the joint block 633 may extend from the positioning plate 65 toward the fixed plate 63, that is, so long as the engaging component 69 is able to engage the concavities 637 of the joint block 633, the joint block 633 may extend from either one of the fixed and positioning plates 63, 65 toward the other one of the fixed and positioning plates 63, 65.

Figure 12:
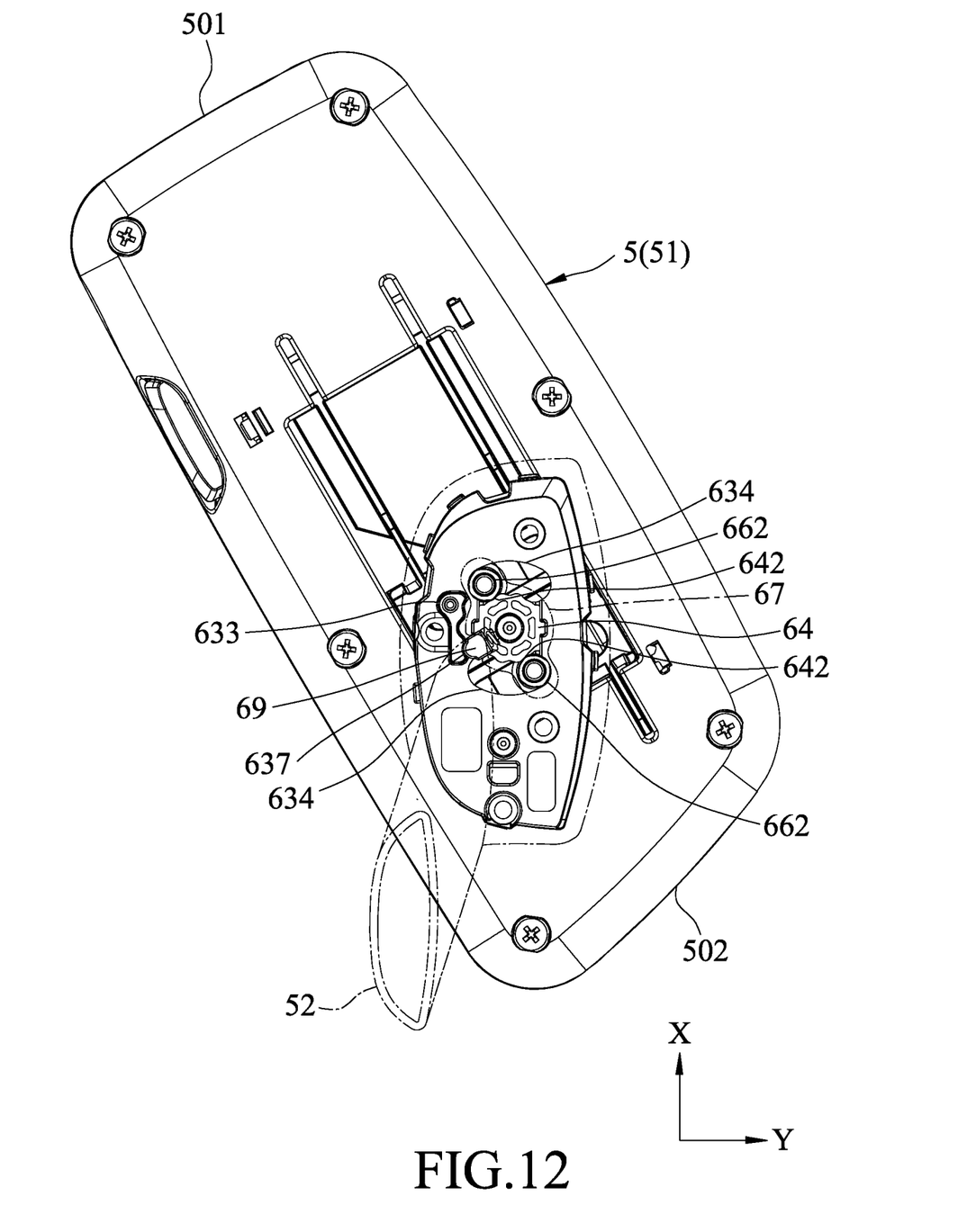
FIG. 12 is another fragmentary bottom view of the armrest assembly, illustrating the rotating unit at an inward position relative to the fixed unit.
Figure 13:
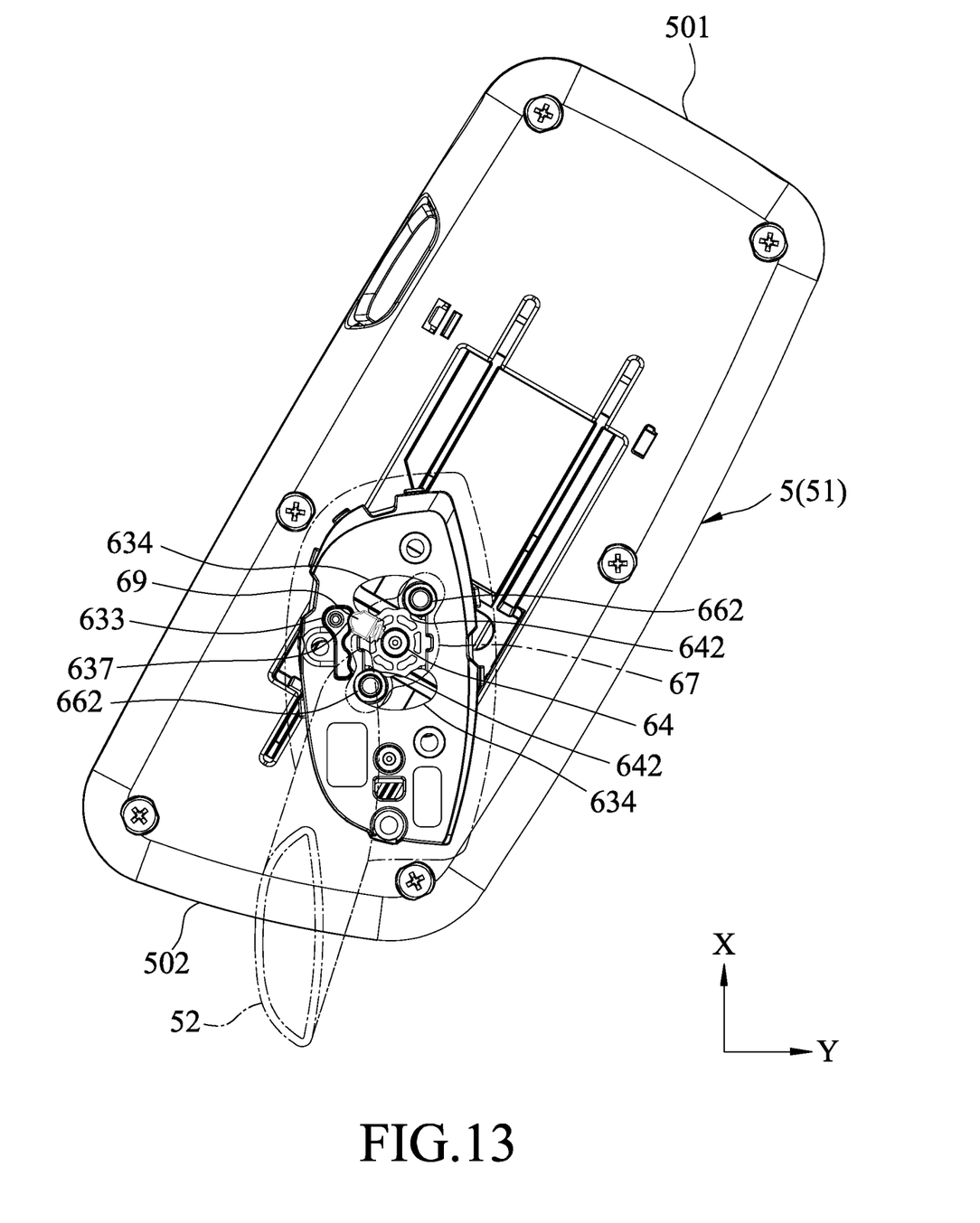
FIG. 13 is yet another fragmentary bottom view of the armrest assembly, illustrating the rotating unit at an outward position relative to the fixed unit.

Referring to FIGS. 10, 12 and 13, the rotating unit 62 is convertible relative to the fixed unit 61 among an inward position (see FIG. 12), an outward position (see FIG. 13), and a neutral position (see FIG. 10) between the inward and outward positions.

When the rotating unit 62 is at the neutral position, the engaging protrusion 693 of the engaging component 69 protrudes in a direction that is substantially perpendicular to the neutral axis (NA) and the rotational axis (RA). The rotating columns 662 of the rotating unit 62 engage two corresponding notches 642 of the fixed unit 61 that are opposite along the neutral axis (NA). The engaging protrusion 693 engages the middle one of the concavities 637 of the joint block 633 of the fixed unit 61. The arm member 51 of the armrest 5 extends substantially in the front-rear direction (X).

When the rotating unit 62 is converted from the neutral position to the inward position, the rotating columns 662 of the rotating unit 62 are disengaged from the two notches 642 and slide to engage another two corresponding notches 642 that are misaligned with the neutral axis (NA). The engaging protrusion 693 is disengaged from the middle one of the concavities 637 and slides to engage the lower one of the concavities 637 (as shown in FIGS. 10 and 12, from the perspective of the viewer). The arm member 51 of the armrest 5 is rotated counterclockwise (from the perspective of the viewer) to be transverse to the front-rear direction (X); specifically, the front end 501 of the arm member 51 is steered slightly toward the user sitting in the chair, while the rear end 502 of the arm member 51 is steered slightly away from the user.

When the rotating unit 62 is converted from the neutral position to the outward position, the rotating columns 662 of the rotating unit 62 are disengaged from the two notches 642 and slide to engage the other two corresponding notches 642 that are misaligned with the neutral axis (NA). The engaging protrusions 693 is disengaged from the middle one of the concavities 637 and slides to engage the upper one of the concavities 637 (as shown in FIGS. 10 and 13, from the perspective of the viewer). The arm member 51 of the armrest 5 is rotated clockwise to be transverse to the front-rear direction (X); specifically, the front end 501 of the arm member 51 is steered slightly away from the user, while the rear end 502 of the arm member 51 is steered slightly toward the user. In such a manner, the user is able to adjust the armrest 5 to fit their needs.

In sum, in virtue of the engagements between the two rotating columns 662 and two of the notches 642 of the elastic plate 64, and the engagement between the engaging component 69 and one of the concavities 637 of the joint block 633, the adjustment mechanism 6 of the armrest assembly 400 of the present embodiment has three areas of contact. Compared with the adjustment mechanism of the prior art which has only two areas of contact, the present embodiment provides more total area of contact to produce more frictional force without having to upscale the size of the armrest 5, and thus provides possibilities of a more compact design.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An adjustment mechanism adapted to be installed in an armrest, the armrest including an arm member and a support member that are arranged in a top-bottom direction, the arm member being disposed over and mounted rotatably to the support member, said adjustment mechanism comprising:
   a fixed unit that is adapted to be fixedly mounted in the support member and that includes
      a fixed plate adapted to be adjacent to the arm member, and having two spaced-apart arc slots that extend therethrough in the top-bottom direction,
      a positioning plate disposed under and fixedly mounted to said fixed plate,
      an elastic plate fixedly mounted to said fixed plate, disposed between said arc slots of said fixed plate, and having an outer peripheral surface that is formed with a plurality of notches, at least two of said notches facing one of said arc slots, the remaining of said notches facing the other one of said arc slots, and
      a joint block extending from one of said fixed and positioning plates toward the other one of said fixed and positioning plates, and having a plurality of concavities; and
   a rotating unit that includes
      a linking plate having a linking plate body that is adapted to be mounted co-rotatably in the arm member, and two rotating columns that are connected to said linking plate body, that are adapted to extend out of the arm member, and that extend respectively and movably into said arc slots of said fixed plate, each of said rotating columns removably engaging a corresponding one of said notches of said elastic plate which faces a respective one of said arc slots,
      a rotating plate disposed between said fixed plate and said positioning plate, and co-rotatably connected to said rotating columns of said linking plate, and
      an engaging component co-rotatably mounted to said rotating plate and removably engaging one of said concavities of said joint block.

2. The adjustment mechanism as claimed in claim 1, wherein:
   said fixed plate further has a fixed shaft that extends along a rotational axis extending in the top-bottom direction, said elastic plate being sleeved on said fixed shaft, said rotating unit being rotatable about said rotational axis;
   said joint block extends from said fixed plate, said concavities of said joint block facing said fixed shaft; and
   said arc slots are arranged along a neutral axis that is perpendicular to the rotational axis, and are disposed respectively at opposite sides of said rotational axis.

3. The adjustment mechanism as claimed in claim 2, wherein:
   said positioning plate is disposed under said elastic plate, and has a positioning hole engaged with said fixed shaft of said fixed plate; and
   said rotating plate has an outer peripheral surface surrounding said rotational axis and formed with a receiving slot that is proximate to said concavities of said joint block; and
   said engaging component is movably received in said receiving slot and having an engaging protrusion that removably engages said one of said concavities.

4. The adjustment mechanism as claimed in claim 3, wherein:
   said rotating plate further has
      a through hole that is spatially communicated with said receiving slot, said fixed shaft engaging said through hole, and
      two spaced-apart screw holes that are disposed respectively at opposite sides of said through hole; and
   said rotating unit further includes two connecting fasteners that extend respectively through said rotating columns and that engaging respectively and threadedly said screw holes of said rotating plate.

5. The adjustment mechanism as claimed in claim 3, wherein said engaging component includes:
   an engaging seat that is movably received in said receiving slot and that has said engaging protrusion; and
   a spring that is connected to said engaging seat for enhancing the engagement between said engaging protrusion and said one of said concavities.

6. The adjustment mechanism as claimed in claim 3, wherein:
   said fixed plate further has a fixed plate body that is adapted to be adjacent to the arm member of said armrest, and that is formed with said arc slots; and
   said fixed shaft includes a shaft tube that extends from said fixed plate body in the top-bottom direction, and a positioning fastener that extends through said shaft tube and that threadedly engaging said positioning hole of said positioning plate.

7. The adjustment mechanism as claimed in claim 3, wherein:
   said rotating unit is convertible relative to said fixed unit among an inward position, an outward position, and a neutral position between the inward and outward positions; and
   said engaging protrusion of said engaging component protrudes in a direction that is substantially perpendicular to the neutral axis and the rotational axis when said rotating unit is at the neutral position.

8. The adjustment mechanism as claimed in claim 2, wherein said elastic plate further has:

a center hole, said fixed shaft of said fixed plate extending through said center hole; and a plurality of buffer holes that extend through said elastic plate, and that are arranged between said center hole and said outer peripheral surface of said elastic plate.

9. An armrest assembly comprising:

an armrest that includes an arm member and a support member being arranged in a top-bottom direction, said arm member being disposed over and mounted rotatably to said support member; and said adjustment mechanism as claimed in claim 1 that is installed in said armrest.

10. A chair comprising:

a seat assembly;

a base assembly that is disposed under and mounted to said seat assembly; and at least one of said armrest assembly as claimed in claim 9 that is connected to said seat assembly.

* * * * *